United States Patent
Huglen

(10) Patent No.: US 10,291,099 B1
(45) Date of Patent: May 14, 2019

(54) BIOMECHANICAL ELECTRICITY GENERATING ASSEMBLY INCLUDING SLEEVE WITH LEG ACTUATED DYNAMOS

(71) Applicant: R C Huglen, Eugene, OR (US)

(72) Inventor: R C Huglen, Eugene, OR (US)

( * ) Notice: Subject to any disclaimer, the term of this patent is extended or adjusted under 35 U.S.C. 154(b) by 0 days.

(21) Appl. No.: 15/969,930

(22) Filed: May 3, 2018

(51) Int. Cl.
*F03G 5/08* (2006.01)
*H02J 7/00* (2006.01)
*H02K 7/116* (2006.01)
*F03G 5/00* (2006.01)
*H02K 7/18* (2006.01)
*H02K 11/04* (2016.01)
*F03G 5/06* (2006.01)

(52) U.S. Cl.
CPC ............. *H02K 7/1853* (2013.01); *F03G 5/06* (2013.01); *H02J 7/0052* (2013.01); *H02K 7/116* (2013.01); *H02K 11/046* (2013.01); *H02J 2007/0062* (2013.01)

(58) Field of Classification Search
CPC .... H02K 7/1853; H02K 7/116; H02K 11/046; H02J 7/0052; H02J 2007/0062; F03G 5/06; F03G 5/08
See application file for complete search history.

(56) References Cited

U.S. PATENT DOCUMENTS

| | | |
|---|---|---|
| D510,140 S | 9/2005 | Brown |
| 7,327,046 B2 | 2/2008 | Biamonte |
| 8,314,503 B2 | 11/2012 | Liu et al. |
| 8,562,548 B2 | 10/2013 | Shimada |
| 8,723,342 B2 | 5/2014 | Kozinsky |
| 9,057,361 B2 | 6/2015 | Donelan |
| 9,160,022 B2 | 10/2015 | Pruett |
| 2009/0259320 A1 | 10/2009 | Andrysek |
| 2016/0028264 A1 | 1/2016 | Bernhard |

*Primary Examiner* — Tulsidas C Patel
*Assistant Examiner* — S. Mikailoff

(57) ABSTRACT

A biomechanical electricity generating assembly for powering electronic devices includes a sleeve that has opposing ends, which are open. The sleeve is configured to insert a limb of a user to couple the sleeve to the user with the sleeve positioned over a joint of the limb. Each of a pair of bars is coupled longitudinally to a respective opposing side of the sleeve. Each bar comprises a first section that is pivotally coupled to a second section. Each of a pair of dynamos is coupled to a respective opposing side of the sleeve and is operationally coupled to an associated bar. Pivoting of the first section of the associated bar relative to the second section by action of the user articulating the limb actuates the dynamo to generate an electrical current.

14 Claims, 7 Drawing Sheets

US 10,291,099 B1

BIOMECHANICAL ELECTRICITY GENERATING ASSEMBLY INCLUDING SLEEVE WITH LEG ACTUATED DYNAMOS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to electricity generating assemblies and more particularly pertains to a new electricity generating assembly for powering electronic devices.

BRIEF SUMMARY OF THE INVENTION

An embodiment of the disclosure meets the needs presented above by generally comprising a sleeve that has opposing ends, which are open. The sleeve is configured to insert a limb of a user to couple the sleeve to the user with the sleeve positioned over a joint of the limb. Each of a pair of bars is coupled longitudinally to a respective opposing side of the sleeve. Each bar comprises a first section that is pivotally coupled to a second section. Each of a pair of dynamos is coupled to a respective opposing side of the sleeve and is operationally coupled to an associated bar. Pivoting of the first section of the associated bar relative to the second section by action of the user articulating the limb actuates the dynamo to generate an electrical current.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
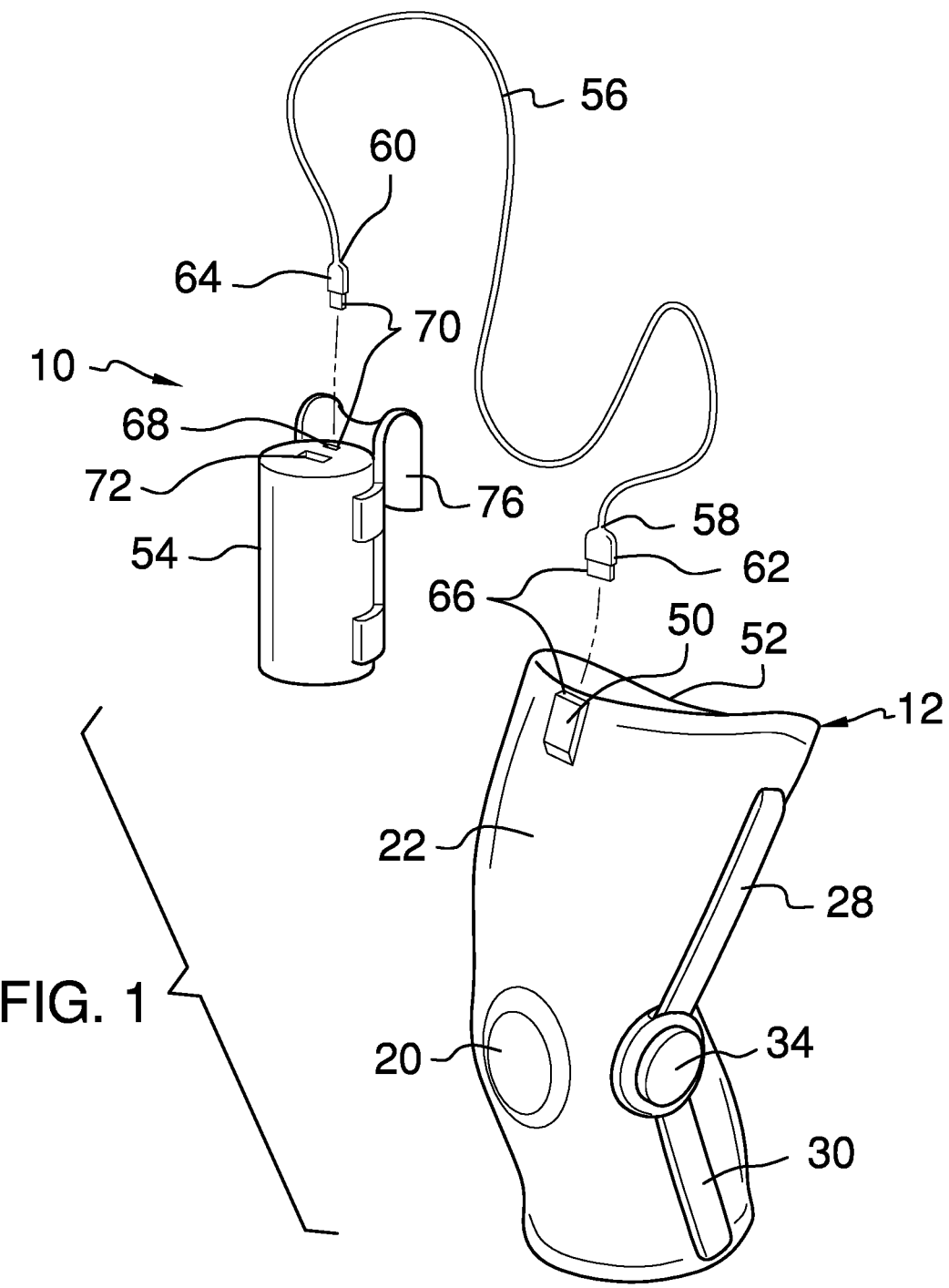
FIG. 1 is an isometric perspective view of a biomechanical electricity generating assembly according to an embodiment of the disclosure.

With reference now to the drawings, and in particular to FIGS. 1 through 7 thereof, a new electricity generating assembly embodying the principles and concepts of an embodiment of the disclosure and generally designated by the reference numeral 10 will be described.

Figure 5:
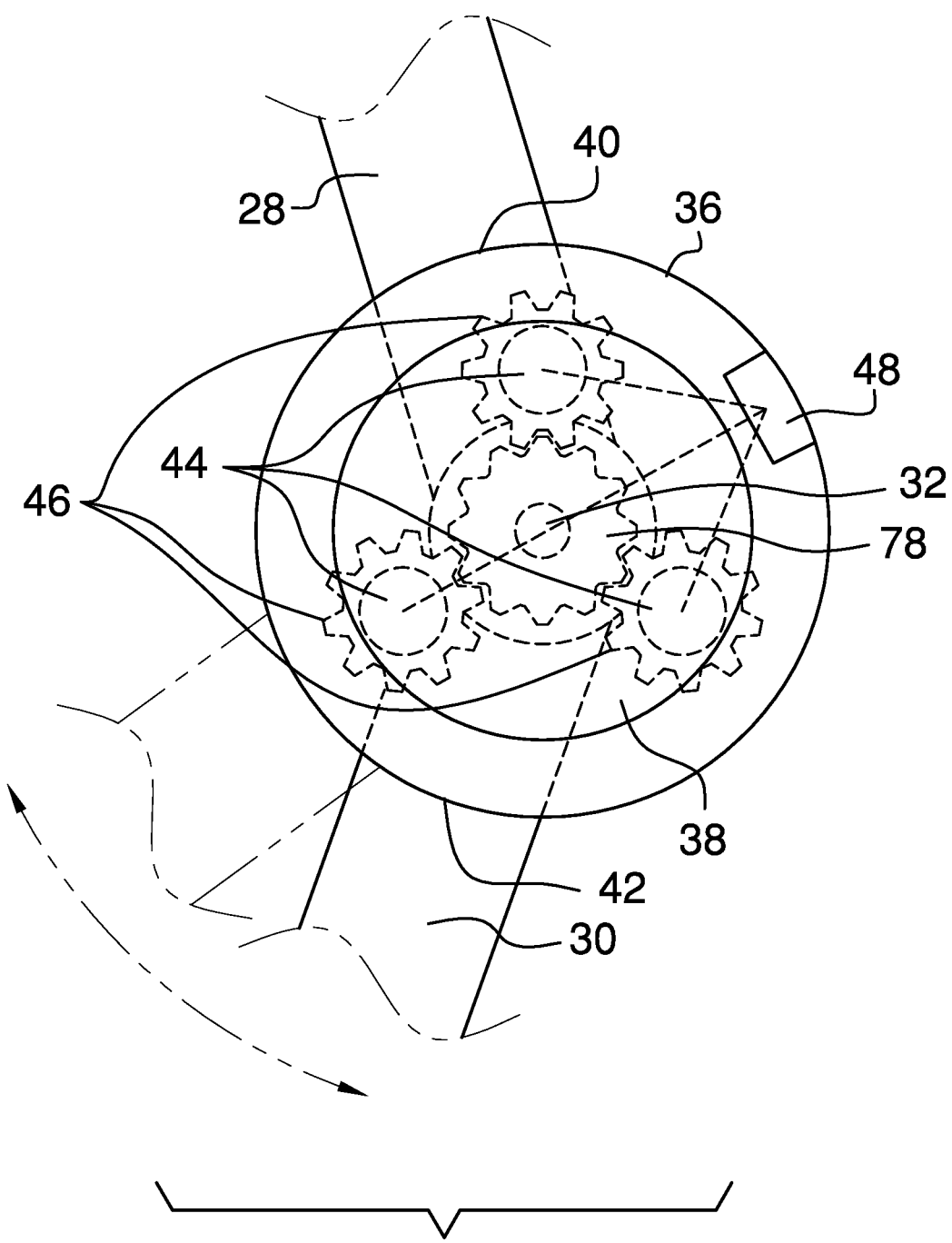
FIG. 5 is a detail view of an embodiment of the disclosure.
Figure 6:
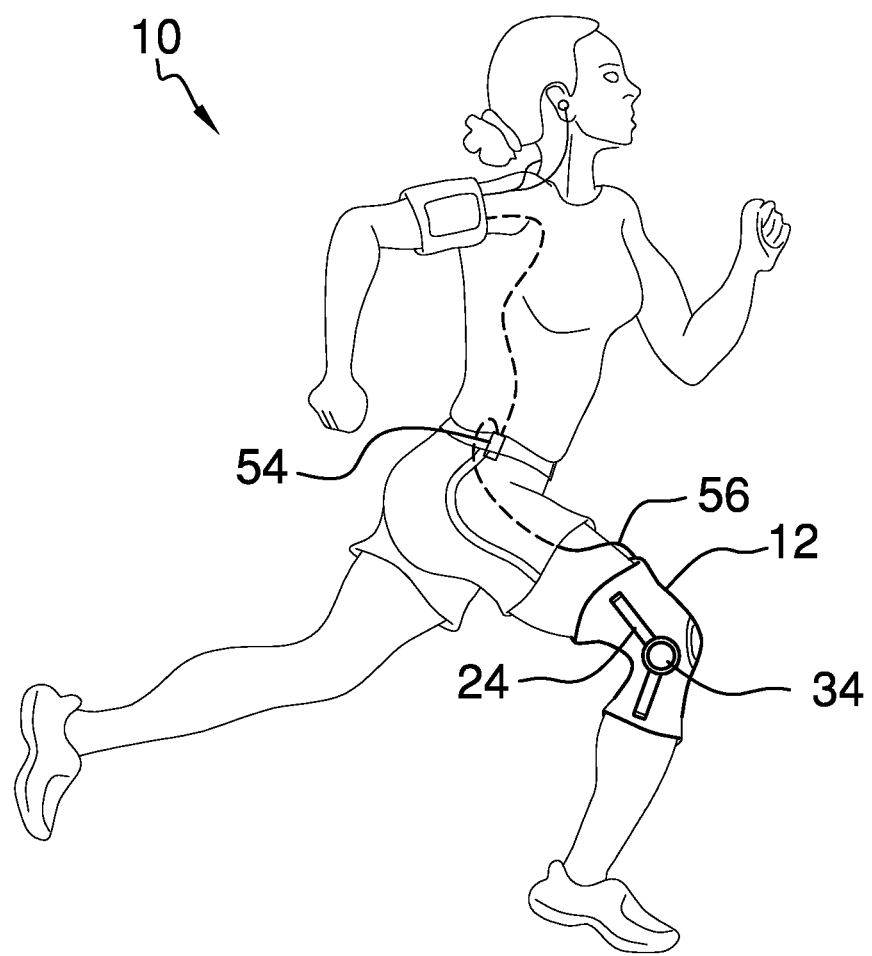
FIG. 6 is an in-use view of an embodiment of the disclosure.
Figure 7:
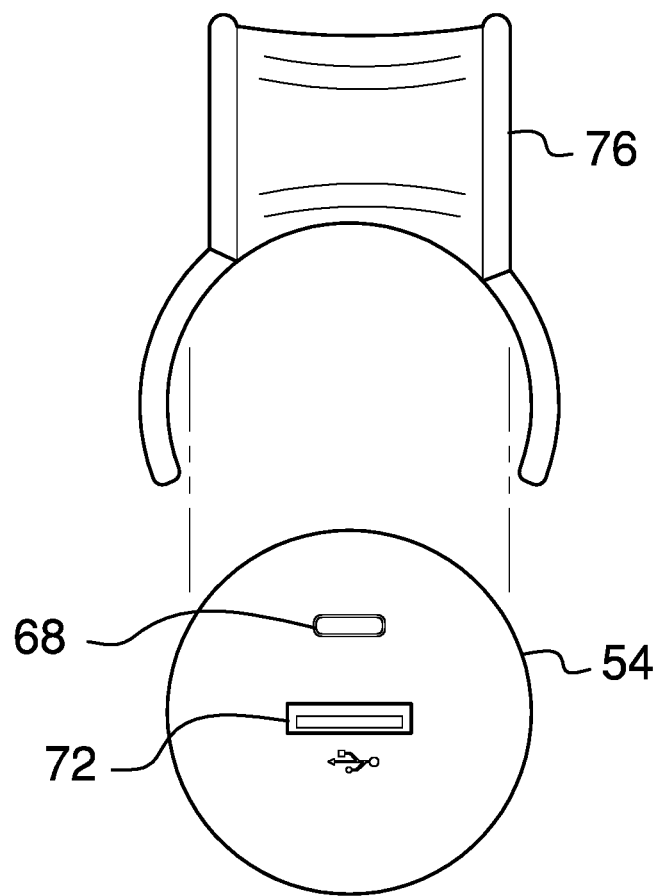
FIG. 7 is a top view of an embodiment of the disclosure.

As best illustrated in FIGS. 1 through 7, the biomechanical electricity generating assembly 10 generally comprises a sleeve 12 that has opposing ends 14, which are open. The sleeve 12 is configured to insert a limb of a user to couple the sleeve 12 to the user with the sleeve 12 positioned over a joint of the limb, as shown in FIG. 6.

The sleeve 12 comprises an outer layer 16 and an inner layer 18. The outer layer 16 comprises breathable fabric. The outer layer 16 comprises elastomer so that the outer layer 16 is resilient. The outer layer 16 is configured to reversibly stretch to insert the limb of the user into the sleeve 12. The inner layer 18 is coupled to the outer layer 16. The inner layer 18 comprises padding. A cup 20 is positioned in a front 22 of the sleeve 12. The cup 20 is configured to insert a knee cap of a leg of the user as the leg is inserted into the sleeve 12.

Figure 3:
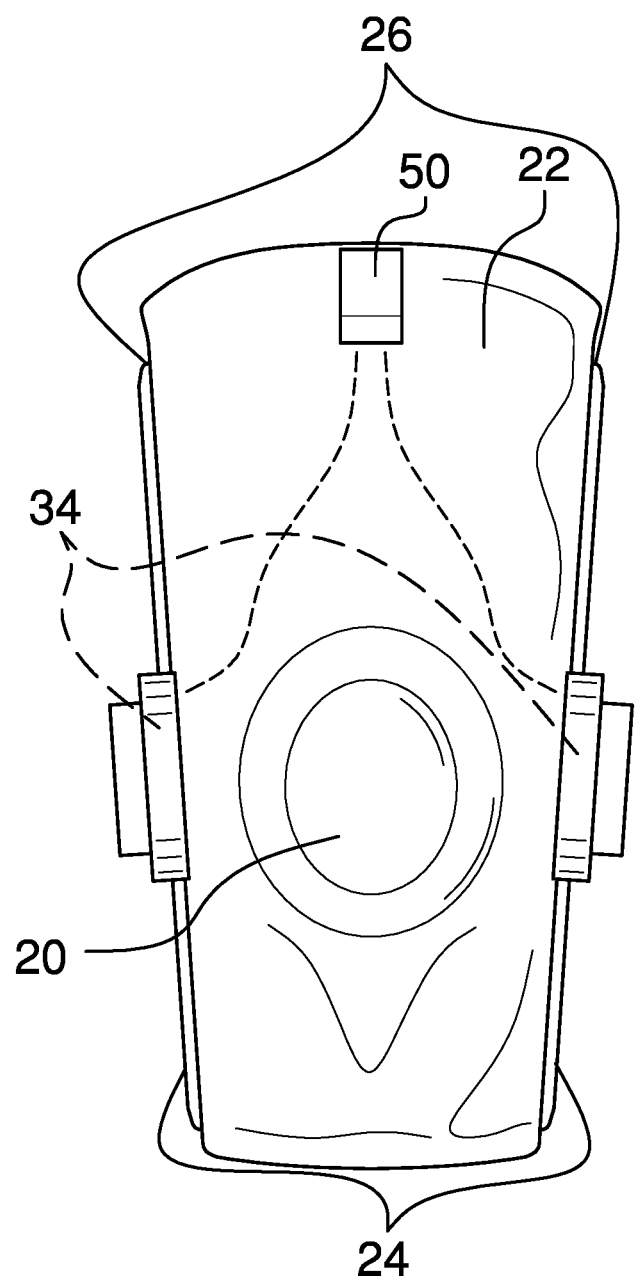
FIG. 3 is a front view of an embodiment of the disclosure.
Figure 4:
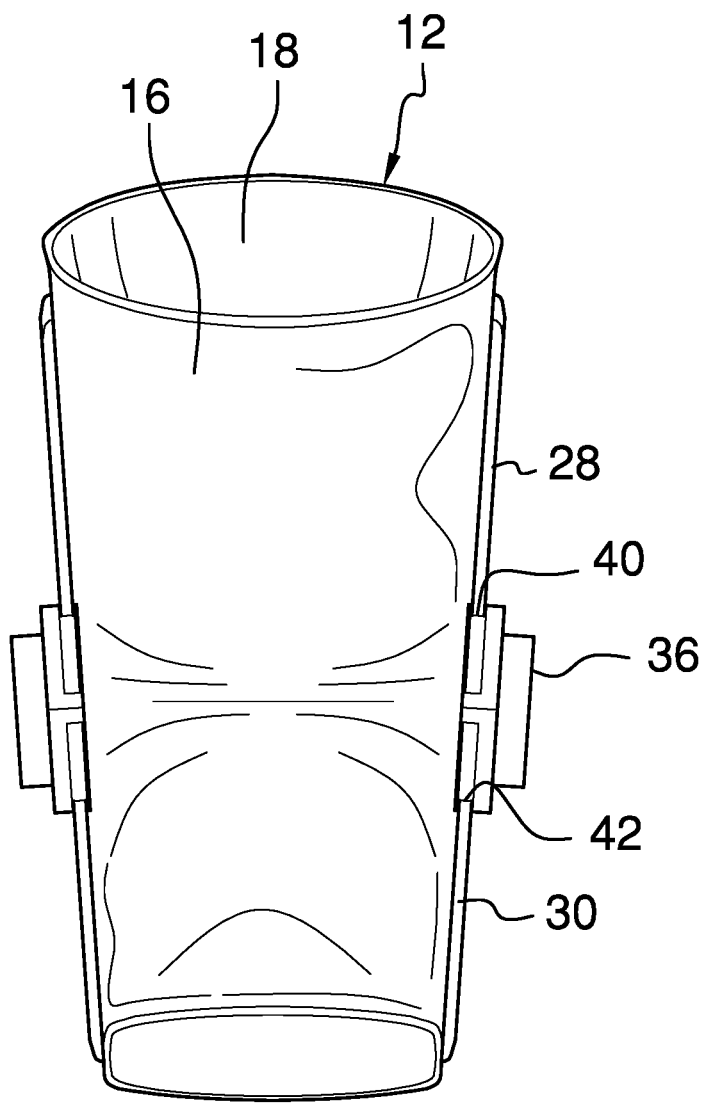
FIG. 4 is a back view of an embodiment of the disclosure.

Each of a pair of bars 24 is coupled longitudinally to a respective opposing side 26 of the sleeve 12, as shown in FIG. 3. Each bar 24 comprises a first section 28 that is pivotally coupled to a second section 30. Each of a pair of axles 32 is coupled to a respective bar 24 so that the axle 32 is fixedly coupled to the first section 28 and rotationally coupled to the second section 30.

Each of a pair of dynamos 34 is coupled to a respective opposing side 26 of the sleeve 12 and is operationally coupled to an associated bar 24. Pivoting of the first section 28 of the associated bar 24 relative to the second section 30 by action of the user articulating the limb actuates the dynamo 34 to generate an electrical current.

Figure 2:
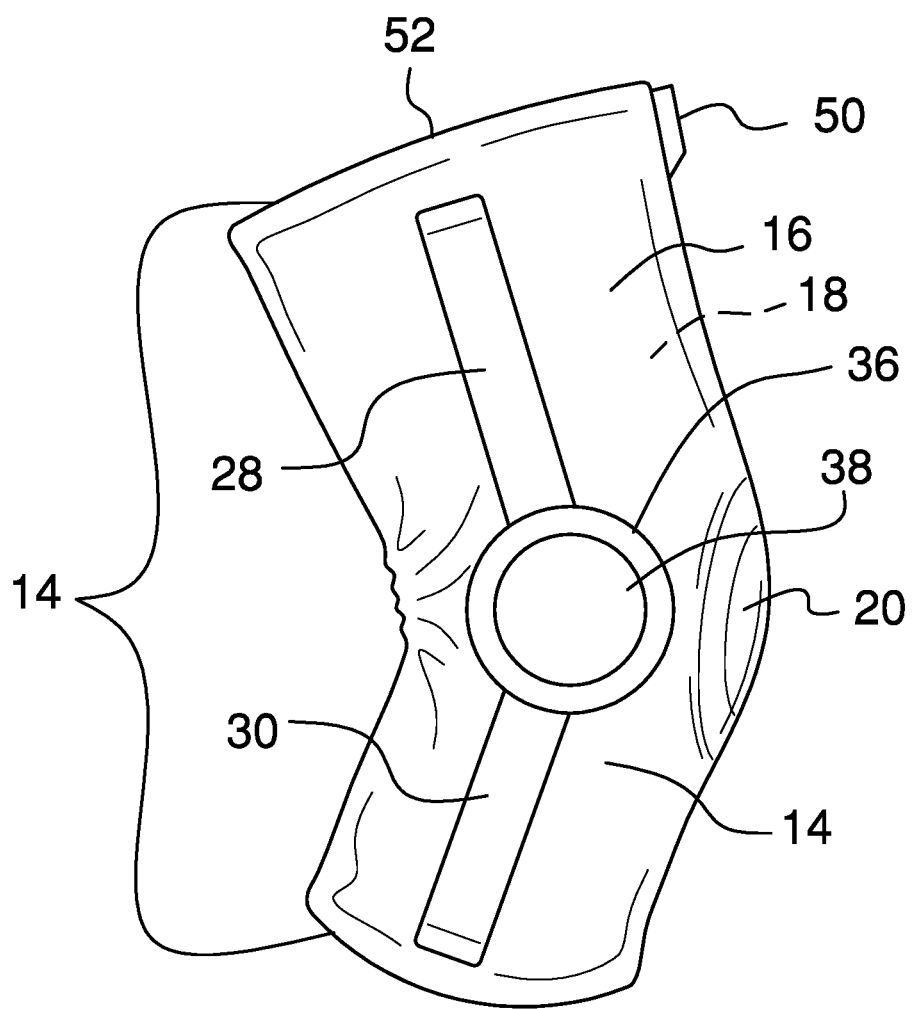
FIG. 2 is a side view of an embodiment of the disclosure.

Each dynamo 34 comprises a housing 36 that is coupled to the respective opposing side 26 of the sleeve 12, as shown in FIG. 2. The housing 36 defines an interior space 38. The first section 28 of an associated bar 24 protrudes from the housing 36 through a first slot 40, as shown in FIG. 1. The second section 30 of the associated bar 24 protrudes from the housing 36 through a second slot 42. An associated axle 32 is positioned within the interior space 38. A sun gear 78 is coupled to the associated axle 32, as shown in FIG. 5.

A plurality of generators 44 is coupled to the housing 36 and is positioned in the interior space 38. The plurality of generators 44 comprises three generators 44. Each of a plurality of planet gears 46 is axially coupled to a respective generator 44 and is gearedly coupled to the sun gear 78, as shown in FIG. 5. The first section 28 is configured to pivot concurrently with the articulation of the joint of the user to rotate the associated axle 32. The sun gear 78 rotates concurrently with the associated axle 32 to rotate the planet gears 46 to actuate the generators 44 to generate the electrical current.

A rectifier 48 is coupled to the housing 36 and is positioned in the interior space 38. The rectifier 48 is operationally coupled to the plurality of generators 44. The rectifier 48 is positioned to rectify the electrical current produced by the plurality of generators 44.

A connector 50 is coupled to the sleeve 12, as shown in FIG. 1. The connector 50 is operationally coupled to the pair of dynamos 34. The connector 50 is configured to couple the pair of dynamos 34 to an electronic device of the user to power the electronic device and to charge a battery of the electronic device, as shown in FIG. 6. The connector 50 is positioned on the front 22 proximate to an upper end 52 of the sleeve 12.

The assembly 10 comprises a power cell 54 and a cord 56, as shown in FIG. 1. The power cell 54 is selectively couplable to the connector 50. The connector 50 is configured to couple the pair of dynamos 34 to the power cell 54 to charge the power cell 54. The cord 56 has a first end 58 and a second end 60. A first coupler 62 is coupled to a first end 58 and a second coupler 64 is coupled to a second end 60. The first coupler 62 is complementary to the connector 50. The first coupler 62 is positioned to couple to the connector 50 to operationally couple the cord 56 to the pair of dynamos 34. The first coupler 62 and the connector 50 comprise a first Universal Serial Bus connection 66.

A third coupler 68 is coupled to the power cell 54. The third coupler 68 is complementary to the second coupler 64. The third coupler 68 is positioned to couple to the second coupler 64 to operationally couple the cord 56 to the power cell 54. The third coupler 68 and the second coupler 64 comprise a second Universal Serial Bus connection 70.

A fourth coupler 72 is coupled to the power cell 54. The fourth coupler 72 is configured to couple the electronic device of the user to the power cell 54 to power the electronic device and to charge the battery of the electronic device. The fourth coupler 72 comprises a Universal Serial Bus port 74.

A clip 76 is coupled to the power cell 54, as shown in FIG. 1. The clip 76 is configured to couple to an article of clothing, such as a belt as shown in FIG. 6, that is positioned on the user to couple the power cell 54 to the user.

In use, the leg of the user is inserted into the sleeve 12 couple the sleeve 12 to the user with the sleeve 12 positioned over a joint of the limb and with the kneecap positioned in the cup 20. The power cell 54 is coupled to the belt of the user using the clip 76. The power cell 54 is coupled to the connector 50 using the cord 56 and the electronic device of the user is coupled to the fourth coupler 72. Articulation of the leg during walking and running rotates the associated axle 32. The sun gear 78 rotates concurrently with the associated axle 32 to rotate the planet gears 46 to actuate the generators 44 to generate the electrical current to power the electronic device and to charge the battery of the electronic device.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A biomechanical electricity generating assembly comprising:
 a tubular sleeve, said sleeve having opposing ends, said opposing ends being open wherein said sleeve is configured for inserting a limb of a user for coupling said sleeve to the user with said sleeve positioned over a joint of the limb;
 a pair of bars, each said bar being coupled longitudinally to a respective opposing side of said sleeve, each said bar comprising a first section pivotally coupled to a second section; and
 a pair of dynamos, each said dynamo being coupled to a respective opposing side of said sleeve and operationally coupled to an associated one of said bars wherein pivoting of said first section of said associated one of said bars relative to said second section by action of the user articulating the limb actuates said dynamo for generating an electrical current; and
 a pair of axles, each said axle being coupled to a respective one of said bars such that said axle is fixedly coupled to said first section of said respective one of said bars and rotationally coupled to said second section of said respective one of said bars;
 wherein each said dynamo comprises:
  a housing coupled to said respective opposing side of said sleeve, said housing defining an interior space, said first section of said associated one of said bars protruding from said housing through a first slot, said second section of said associated one of said bars protruding from said housing through a second slot such that an associated one of said axles is positioned within said interior space,
  a sun gear coupled to said associated axle,
  a plurality of generators coupled to said housing and positioned in said interior space, and
  a plurality of planet gears, each of said planet gears being axially coupled to a respective one of said generators and gearedly coupled to said sun gear wherein said first section is configured for pivoting concurrent with the articulating of the limb of the user, thereby rotating said associated axle such that said sun gear rotates concurrent with said associated axle for rotating said planet gears for actuating said generators for generating the electrical current.

2. The assembly of claim 1, further including a connector coupled to said sleeve, said connector being operationally coupled to said pair of dynamos wherein said connector is configured for coupling said pair of dynamos to an electronic device of the user for powering the electronic device and for charging a battery of the electronic device.

3. The assembly of claim 2, further including said connector being positioned on a front of said sleeve, proximate to an upper end of said sleeve.

4. The assembly of claim 1, further including said sleeve comprising:
   an outer layer, said outer layer comprising breathable fabric, said outer layer comprising elastomer such that said outer layer is resilient wherein said outer layer is configured for reversibly stretching for inserting the limb of the user into said sleeve; and
   an inner layer coupled to said outer layer, said inner layer comprising padding.

5. The assembly of claim 4, further including a cup positioned in a front of said sleeve wherein said cup is configured for inserting a knee cap of a leg of the user as the leg is inserted into said sleeve.

6. The assembly of claim 1, wherein said plurality of generators comprises three generators.

7. The assembly of claim 1, further including a rectifier coupled to said housing and positioned in said interior space, said rectifier being operationally coupled to said plurality of generators wherein said rectifier is positioned for rectifying the electrical currents produced by said plurality of generators.

8. The assembly of claim 2, further including a power cell selectively couplable to said connector wherein said connector is configured for coupling said pair of dynamos to said power cell for charging said power cell.

9. The assembly of claim 8, further comprising:
   a cord having a first coupler coupled to a first end and a second coupler coupled to a second end, said first coupler being complementary to said connector wherein said first coupler is positioned for coupling to said connector for operationally coupling said cord to said pair of dynamos; and
   a third coupler coupled to said power cell, said third coupler being complementary to said second coupler wherein said third coupler is positioned for coupling to said second coupler for operationally coupling said cord to said power cell.

10. The assembly of claim 9, further comprising:
    said first coupler and said connector comprising a first Universal Serial Bus connection; and
    said third coupler and said second coupler comprising a second Universal Serial Bus connection.

11. The assembly of claim 9, further including a fourth coupler coupled to said power cell, said fourth coupler being configured for coupling the electronic device of the user to said power cell for powering the electronic device and for charging the battery of the electronic device.

12. The assembly of claim 11, further including said fourth coupler comprising a Universal Serial Bus port.

13. The assembly of claim 8, further including a clip coupled to said power cell wherein said clip is configured for coupling to an article of clothing positioned on the user for coupling said power cell to the user.

14. A biomechanical electricity generating assembly comprising:
   a tubular sleeve, said sleeve having opposing ends, said opposing ends being open wherein said sleeve is configured for inserting a leg of a user for coupling said sleeve to the user with said sleeve positioned over a joint of the limb, said sleeve comprising:
      an outer layer, said outer layer comprising breathable fabric, said outer layer comprising elastomer such that said outer layer is resilient wherein said outer layer is configured for reversibly stretching for inserting the limb of the user into said sleeve, and
      an inner layer coupled to said outer layer, said inner layer comprising padding;
   a cup positioned in a front of said sleeve wherein said cup is configured for inserting a knee cap of the leg of the user as the leg is inserted into said sleeve;
   a pair of bars, each said bar being coupled longitudinally to a respective opposing side of said sleeve, each said bar comprising a first section pivotally coupled to a second section;
   a pair of axles, each said axle being coupled to a respective one of said bars such that said axle is fixedly coupled to said first section of said respective one of said bars and rotationally coupled to said second section of said respective one of said bars;
   a pair of dynamos, each said dynamo being coupled to a respective opposing side of said sleeve and operationally coupled to an associated one of said bars wherein pivoting of said first section of said associated one of said bars relative to said second section by action of the user articulating the leg actuates said dynamo for generating an electrical current, each said dynamo comprising:
      a housing coupled to said respective opposing side of said sleeve, said housing defining an interior space, said first section of said associated one of said bars protruding from said housing through a first slot, said second section of said associated one of said bars protruding from said housing through a second slot such that an associated one of said axles is positioned within said interior space,
      a sun gear coupled to associated said axle,
      a plurality of generators coupled to said housing and positioned in said interior space, said plurality of generators comprising three generators,
      a plurality of planet gears each said planet gears being axially coupled to a respective one of said generators and gearedly coupled to said sun gear wherein said first section is configured for pivoting concurrent with the articulating of the leg of the user, thereby rotating said associated axle such that said sun gear rotates concurrently with said associated axle for rotating said planet gears for actuating said generators for generating the electrical current, and
      a rectifier coupled to said housing and positioned in said interior space, said rectifier being operationally coupled to said plurality of generators wherein said rectifier is positioned for rectifying the electrical currents produced by said plurality of generators;
   a connector coupled to said sleeve, said connector being operationally coupled to said pair of dynamos wherein said connector is configured for coupling said pair of dynamos to an electronic device of the user for powering the electronic device and for charging a battery of the electronic device, said connector being positioned on said front of said sleeve, proximate to an upper end of said sleeve;

a power cell selectively couplable to said connector wherein said connector is configured for coupling said pair of dynamos to said power cell for charging said power cell;

a cord having a first coupler coupled to a first end of said cord and a second coupler coupled to a second end of said cord, said first coupler being complementary to said connector wherein said first coupler is positioned for coupling to said connector for operationally coupling said cord to said pair of dynamos, said first coupler and said connector comprising a first Universal Serial Bus connection;

a third coupler coupled to said power cell, said third coupler being complementary to said second coupler wherein said third coupler is positioned for coupling to said second coupler for operationally coupling said cord to said power cell, said third coupler and said second coupler comprising a second Universal Serial Bus connection;

a fourth coupler coupled to said power cell, said fourth coupler being configured for coupling the electronic device of the user to said power cell for powering the electronic device and for charging the battery of the electronic device, said fourth coupler comprising a Universal Serial Bus port; and a clip coupled to said power cell wherein said clip is configured for coupling to an article of clothing positioned on the user for coupling said power cell to the user.

* * * * *